United States Patent Office 2,715,065
Patented Aug. 9, 1955

2,715,065
PRODUCTION OF PAPER OF SUPERIOR WET STRENGTH

David B. Hatcher, Toledo, Ohio, assignor, by mesne assignments, to Allied Chemical & Dye Corporation, New York, N. Y., a corporation of New York No Drawing. Application November 24, 1950, Serial No. 197,508

8 Claims. (Cl. 92—3)

The invention relates to the production of novel resin-impregnated paper of superior wet strength that is less expensive than the paper of similar wet strength heretofore known.

When used for imparting wet strength to paper, a synthetic resin is usually incorporated at the wet end of the paper making process, for example, in the beater or at the head box. A synthetic resin that is incorporated at the wet end of the paper making process must be capable of dilution without precipitation of the resin, and must have an affinity for the paper fibers so that a reasonably large proportion of the resin deposits on the paper fibers and so that an unreasonably large proportion of the resin is not lost in the waste water.

Melamine-formaldehyde resins that impart high wet strength to paper are known, but they are considerably more expensive than urea-formaldehyde resins. Moreover, in order to be used for imparting wet strength to paper, the known melamine-formaldehyde resins must be treated with a strong mineral acid just before use. Such treatment with a strong mineral acid makes it necessary to use special equipment because of the corrosive nature of the acid.

The principal object of the invention is the production of novel urea-formaldehyde resin-impregnated paper having wet strength that is substantially greater than that of the urea-formaldehyde resin-impregnated paper heretofore known and is at least as great as that of the melamineformaldehyde resin-impregnated paper heretofore known. More specific objects and advantages are apparent from the description, which discloses and illustrates but is not intended to limit the invention.

Heretofore it was believed that dialkylamines were not useful for the modification of urea-formaldehyde resins used for imparting wet strength to paper. The present invention is based upon the discovery that dimethylamine gives excellent results when used for the modification of such urea-formaldehyde resins, whereas other dialkylamines are inoperative when so used.

The uniqueness of the properties of dimethylamine has been demonstrated by comparing its properties with those of diethylamine, as follows:

A dimethylamine-modified urea-formaldehyde resin of the invention was prepared by the following procedure: Dimethylamine hydrochloride (49 grams) was added to 564 grams of solution consisting of 45 per cent formaldehyde and 55 per cent water. (The terms "per cent" and "parts" are used herein to mean per cent and parts by weight unless otherwise specified.) Subsequently, the pH was adjusted to about 6.7 by the addition of sodium hydroxide. Urea (240 grams) was then added to the solution and the mixture was heated to a temperature of about 95° C. within about 15 minutes. After this temperature was attained, formic acid was added to adjust the pH to about 5.4, and the heating was continued for a total time of about 2¼ hours at temperatures ranging from about 80 to about 95° C., until the viscosity of the solution was K (measured at 25° C. by the standard Gardner-Holdt bubble viscosity method). The solution was cooled to 60 degrees C. and maintained at that temperature until the viscosity was U. The pH of the resulting resin was adjusted with sodium hydroxide to 7.6.

A diethylamine-modified urea-formaldehyde resin was prepared as follows: Diethylamine (43.9 grams) was added to 564 grams of a solution consisting of 45 per cent formaldehyde and 55 per cent water. Hydrochloric acid was added to adjust the pH to about 6.2. Urea (240 grams) was then added and the resulting solution was adjusted to a pH of about 7.0 by the addition of sodium hydroxide. The solution was then heated, and when the temperature had risen to about 92° C. the pH was adjusted to about 5.8 by the addition of formic acid. Heating was continued for a total time of 2¾ hours at temperatures ranging from 90 to 95° C., until the viscosity was I (Gardner-Holdt). The resulting solution was cooled and then held at a temperature of about 58° C. until the viscosity was M (Gardner-Holdt).

The resin embodying the invention prepared from dimethylamine was found to be soluble at nearly all dilutions and at nearly all pH values—even at a highly alkaline pH. On the other hand, the control resin prepared from diethylamine was very insoluble even at the most favorable solution conditions of high temperature and mild acidity.

The resin prepared from diethylamine was tested for solubility with tap water at 20° C. and was found to be completely insoluble in dilute solution. It would, therefore, be impossible to use such a resin for wet end addition in the preparation of paper because temperatures of pulp mill solutions are usually below 20° C. and because resins used for wet end additions must be capable of forming a 0.1 per cent aqueous solution at such temperatures.

The resins embodying the invention, because of their excellent solubility at all concentrations and within a wide pH range, are very useful for impregnation of pulp by "wet end addition" in the manufacture of wet strength paper. Furthermore, the resins of the invention are very soluble at the solution temperatures usually encountered in paper manufacture.

A resin embodying the invention is a product of the reaction with formaldehyde and urea and dimethylamine, the proportion of dimethylamine being from 0.01 to 0.3 mol per mol of urea. A urea-formaldehyde resin must be capable of forming a 0.1 per cent aqueous solution at ordinary temperatures in order to be used at the wet end of the paper making process, because a urea-formaldehyde resin cannot be incorporated successfully at the wet end unless it is that soluble. In practice the resin must be prepared in the form of a relatively concentrated solution or in dry form, and must be dispersed and dissolved as it is added at the wet end. If the resin is not sufficiently soluble to be capable of forming a 0.1 per cent aqueous solution, the resin as it is added forms curds which cannot be readily dissolved and which cause great inconvenience by necessitating frequent cleaning of the beater and associated apparatus. The formation of curds leads to serious difficulties because in practice it is necessary to incorporate the resin under acid conditions, and under such acid conditions, the curds, after depositing on the equipment, are converted to the insoluble state.

One of the important functions of dimethylamine used in producing a resin embodying the invention is to impart the required solubility to the resin. If the amount of dimethylamine used were merely the amount required to neutralize the commercial aqueous formaldehyde solution, the amount would be so small that the solubility of the resulting condensation product would be completely insufficient to permit the condensation product to be incorporated in paper by addition at the wet end of the paper making process.

The formaldehyde employed in the preparation of thermosetting synthetic resins for use in the practice of the invention may be in the form of one of its polymers such as paraformaldehyde or may be used in any combination with one of its polymers. Usually an aqueous reaction medium is used, consisting of the water present in an aqueous formaldehyde solution. Although the formaldehyde used may be ordinary commercial formalin (i. e., an aqueous solution comprising approximately 37 per cent formaldehyde by weight), it is preferred that the concentration of formaldehyde in the aqueous solution used be about 45 or 50 per cent. Further dilution during the reaction is undesirable since it results in resins having decreased stability and lower solubility. Reacting at a higher solids concentration than is achieved using ordinary commercial formalin results in resins which have improved water solubility and which impart greater wet strength. The stability of resins reacted at higher solids concentrations (i. e., resins in which the formaldehyde used is in a concentration of 45 or 50 per cent in aqueous solution) can be increased by dilution of the resin after preparation. Not more than about 2.4 mols of formaldehyde should be used per mol of urea and it is preferable to use not more than about 2.25 mols per mol of urea. Not less than about 1.8 mols of formaldehyde should be used per mol of urea and it is preferable to use not less than about 2.0 mols per mol of urea. It is most desirable to use about 2.1 mols of formaldehyde per mol of urea.

A synthetic resin for imparting wet strength to paper is desirably incorporated at the wet end of the paper making process before the paper is made, since this more convenient and less expensive method of applying the resin to the paper results in a wet-strengthened paper which is not coated with a sealing. This is known as "wet end addition," the term referring not only to addition in the beater but also to addition in the machine chest, head box, fan pump or any other desired point at the wet end of the paper making process. Since in the production of paper the mixture at the point of resin addition ordinarily comprises a very dilute suspension of pulp in water (less than two per cent) and a synthetic resin used for imparting wet strength is usually present in this suspension in a concentration of about one to two per cent of the pulp concentration, such a resin must be capable of dilution without precipitation. Such a resin should be a thermosetting composition so that it can be added in its water-soluble state to disperse and dissolve throughout the paper pulp suspension at the wet end of the paper making process before the paper is made, and then can be converted to a thermoset resin on the paper fibers by heating during drying or aging during storage.

The solubility in water of a urea-formaldehyde resin for use in "wet end addition" is usually represented by a typical parabolic solubility curve, plotted by determining the cloud temperature at various concentrations of resin and water. ("Cloud temperature" is that temperature above which a one phase water solution exists at a given concentration of resin.) The parabolic solubility curve of a resin for use in beater sizing must not represent too large a range of insolubility (cloud formation) at ordinary temperatures. As the resin in concentrated solution or in dry form is added to the pulp suspension in the wet end of the paper making process it may form clouds at the point of addition. It is necessary that the resin reach a concentration at which it is soluble rapidly enough so that the clouds which form at the point of addition of the resin dissolve and disperse before they have time to become curds, for curds adhere to the equipment and usually do not re-dissolve and disperse in the pulp suspension so as to permit the paper fibers to be uniformly coated. If the resin is sufficiently soluble that it is capable of forming a 0.1 per cent aqueous solution at ordinary temperatures (that is, at the practical operating temperatures ordinarily used during beater sizing, approximately 10 to 25 degrees C., varying, of course, with the location of the paper mill) the resin will pass through the concentration at which clouds form too rapidly for the clouds to become curds, and such a resin may be safely used for "wet end addition."

Ordinary urea-formaldehyde resins are far too insoluble when incorporated in the beater under the slightly acid conditions used and form curds before they have had time to be dispersed and dissolved in the water. It is necessary, therefore, to incorporate a modifying agent in a urea-formaldehyde resin which will make such a resin sufficiently soluble so that it will not form curds at ordinary temperatures as it is added to the pulp suspension in the wet end of the paper making process. In the practice of the present invention the modifying agent with which urea and formaldehyde is reacted is dimethylamine or a salt thereof. The minimum amount of dimethylamine which can be used in the present invention is that which will make the resulting condensation product capable of forming a 0.1 per cent aqueous solution at ordinary temperatures so that the resin can be used in "wet end addition." A resin embodying the invention is also capable of imparting high wet strength to paper more inexpensively than any urea-formaldehyde paper treating resin heretofore known.

In general the higher the ratio of formaldehyde to urea, the lower the minimum amount of dimethylamine necessary to produce resins having the required solubility which impart improved wet strength to paper. As much dimethylamine over this minimum amount may be used as seems economically feasible for obtaining a resin with the properties desired. For a given weight of resin the wet strength increases with increasing amounts of dimethylamine until a maximum is reached, after which the wet strength starts to decrease. When an extremely soluble resin is desired, the amount of dimethylamine may be increased over that amount which gives a maximum wet strength per unit of weight of resin. To obtain satisfactory wet strength with such a soluble resin it may be necessary to increase the amount of the resin used. It is preferable to use not less than about 0.01 mol of dimethylamine per mol of urea. Amounts of dimethylamine as large as about 0.3 mol per mol of urea give a very soluble resin which imparts high wet strength more economically than urea-formaldehyde paper treating resins heretofore known, although maximum wet strength per unit of weight is obtained with a resin prepared using 0.05 to 0.15 mol of dimethylamine per mol of urea (with a molar formaldehyde-urea ratio of 2.12:1).

It is believed that the dimethylamine used in the practice of the present invention becomes hydroxymethyldimethylammonium hydroxide (or a salt thereof) when mixed with formaldehyde in a neutral aqueous solution in the present method, and that the hydroxymethyldimethylammonium hydroxide condenses with urea in the formation of a resin of the invention. (As hereinbefore stated, the aqueous reaction medium used in the practice of the present invention is ordinarily derived from an aqueous formaldehyde solution.) That is, it is believed that dimethylamine when dissolved in the aqueous reaction medium forms dimethylammonium hydroxide and that one molecule of formaldehyde in the aqueous reaction medium combines with one molecule of water to form methylene glycol. The methylene glycol molecule condenses with a hydrogen atom in the dimethylammonium hydroxide molecule and with an NH₂ group in the urea molecule as follows:

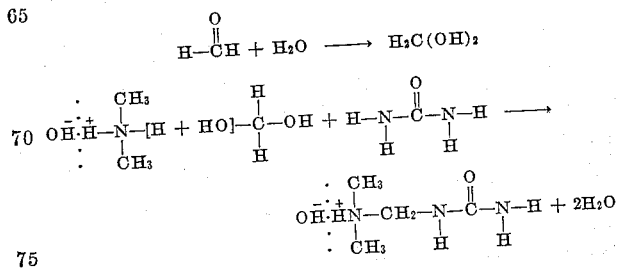

The NH₂ group remaining in the product condenses with additional formaldehyde and urea in the formation of complex resin molecules. It is believed that the dimethylamine which thus becomes part of the urea-formaldehyde resin molecule through its hydrogen atom contributes to the water solubility, and that the dimethylammonium ion which imparts a positive charge to the resin molecule in solution also contributes to the water solubility of the resin. It is believed that the excellent wet-strengthening properties of resins used in the practice of the present invention are due to greater retention of resins containing such a positively charged dimethylammonium ion (which are cationic resins) on the cellulose fibers which are reported to be negatively charged.

In the preparation of resins embodying the invention, the reaction temperature, in general, has little effect on the resin properties, and varying the reaction pH between 4.6 and 5.0 when dimethylamine is used as a gas, and between 5.2 and 6.0, when it is used in the form of a salt such as the hydrochloride, as hereinafter discussed, has no substantial effect on the properties of resins reacted to the same degree of condensation. Reaction at a pH lower than 4.6 to 5.2 may go too rapidly so that the resin gels. Reaction at a pH higher than 5.6 to 6.0 goes less rapidly, and reaction will not proceed satisfactorily if the pH is on the strongly alkaline side. Since at temperatures below 95 degrees C. undesirable by-products form at a pH within the range 4.6 to 5.6, it is desirable to lower the pH to within this range only after the temperature of the reaction mixture reaches about 95 degrees C., to avoid turbidity in the final product. (Although formation of an insoluble by-product has no effect on wet-strengthened paper made from filtered resin, the presence of a precipitate makes colorimetric pH control during the resin preparation very difficult.) It is, therefore, most desirable that the initial pH be within a range of about 6.6 to 7.0 and that the mixture be maintained approximately in this pH range until the temperature is about 95 degrees C. Since the pH of a reaction mixture containing unneutralized dimethylamine is high, it is desirable to adjust the initial pH with an acid. Any acid which gives a salt that is water soluble and does not interfere in the reaction may be used. It is most economical to use a strong inorganic acid such as hydrochloric acid, sulfuric acid or phosphoric acid, although any carboxylic acid having not more than two carbon atoms (i. e., formic acid or acetic acid) or any hydroxy-substituted carboxylic acid having not more than four carbon atoms per carboxy group may be used. This latter acid may be any substance whose molecule consists of a substituted straight or branched hydrocarbon chain having at least one carboxy group and at least one hydroxy group each attached to a primary, secondary, or tertiary carbon atom, and having no substituents other than carboxy and hydroxy groups, said molecule having not more than four carbon atoms per carboxy group (i. e., not more than three additional carbon atoms per carboxy group) and having not more than a total of eight carbon atoms. Such substances include glycolic acid, lactic acid, hydroxyglutaric acid, hydroxybutyric acid, malic acid and tartaric acid. Such an acid will also neutralize part or all of the dimethylammonium hydroxide. At the time of the reaction it is preferred that from 20 to 100 mol per cent of the dimethylammonium hydroxide taking part in the reaction be in the form of a salt of an acid (as hereinbefore described). The salt is largely ionized in the aqueous reaction medium, and some of the cations produced by such ionization combine with hydroxyl ions to form molecules of dimethylammonium hydroxide, so that some of the molecules taking part in the reaction are molecules of dimethylammonium hydroxide. If the water present during the reaction is removed by drying the reaction product, and if the anions from the acid are present in an amount sufficient to combine with all of the dimethyl ammonium ions in the molecules of the reaction product, the ionization of the salt which took place in the aqueous reaction medium is reversed during the drying of the reaction product and all the dimethyl ammonium ions in the dried reaction product combine with the anions from the acid.

A preferred thermosetting synthetic resin for use in the practice of the invention is one in which some or all of the amino groups are thus neutralized.

In the preparation of a thermosetting synthetic resin embodying the invention, the dimethylamine may be added in aqueous solution to the formalin, or, if it is added as a gas, it may be bubbled through the formalin, and the pH adjusted to approximately neutral before addition of the urea. When the substance added to adjust the pH is one of the weaker acids such as formic acid or glycolic acid, it may be added after mixing of the dimethylamine, formalin and urea. If the dimethylamine is used in the form of a salt, e. g. dimethylamine hydrochloride, it is usually necessary to use additional base (for example, dimethylamine or an alkali metal base such as sodium hydroxide) to maintain the solution approximately neutral until the temperature reaches 95 degrees C., since the formalin contains some free formic acid.

In general resins of higher viscosity impart better wet-strength to paper. However, the increase in wet strength may be inappreciable beyond a certain viscosity, and since increased condensation tends to decrease both the stability and the water solubility of the resin, the reaction should be terminated when that viscosity has been reached. The viscosity of resins reacted to the same degree of condensation will, of course, differ in accordance with the solids concentration of the reaction mixture. Resins embodying the present invention in which the proportion of formaldehyde to urea is within the limits hereinbefore given, and in which the concentration of the aqueous solution of formaldehyde used is about 45 per cent, are reacted to a desirable degree of condensation by reacting at 95 degrees C. until the viscosity of the solution is H—J (measured by the Gardner-Holdt bubble viscosimeter standard method), cooling the solution to a temperature of 60 degrees C. and then continuing the reaction at that temperature until the viscosity of the resin solution is U—V.

Using a two-stage reaction (that is, reacting first at 95 degrees C. to a certain viscosity and then reaching the final viscosity by reacting at 60 degrees C.) ordinarily makes the reaction more controllable and gives more reproducible results than a one-stage reaction carried to the same final viscosity at 95 degrees C., although there is no essential difference in the properties of the final product. Usually, the total reaction time must be at least three to four hours in order to allow sufficient time for the viscosity measurements and the temperature and pH adjustments that are necessary for safe control.

The wet-strengthening properties of a resin embodying the invention are increased when the resin is aged at room temperature or even lower temperatures for as long a period of time as the resin remains stable. It is desirable to neutralize the liquid resin with a base such as sodium hydroxide to a pH of at least 7.0 and most desirable to adjust the pH to the range 7.6 to 8.0, for greater stability of the resin.

Resins of the invention used in the present method ordinarily contain from 51 to 53 per cent solids. The stability of such resins may be further improved by diluting to a concentration of about 45 per cent solids.

A finished article embodying the present invention consists of paper of improved wet strength, comprising, in its thermoset state, a product of the reaction in aqueous solution of urea, formaldehyde, and dimethylamine, the proportion of dimethylamine being from 0.01 to 0.3 mol per mol of urea.

Wet-strengthened paper is extremely useful in all paper products which may come in contact with water or moisture during use, for example toweling, food product wrappers, bag and wrapping paper, and map and blue print paper. Use of a resin for imparting wet strength to paper can effect great savings in the manufacture of paper. For example, the beating time and the amount of pulp may be reduced and less expensive pulp may be used.

A thermosetting synthetic resin embodying the invention is less expensive than other urea-formaldehyde paper-treating resins and can be used to impart higher wet strength to paper than any urea-formaldehyde resin heretofore used for treating paper. A resin of the invention can be used in the form in which it is shipped to the paper mill without any pre-treatment, and it imparts wet strength similar to that imparted by the more expensive melamine-formaldehyde resins. Furthermore, a resin of the invention imparts high wet strength with or without the use of a catalyst such as alum or aluminum chloride, in contrast to known commercial urea-formaldehyde resins which must be used with a catalyst to obtain high wet strength. This is particularly advantageous since alum seems to have an adverse effect on the water absorbency of wet-strengthened paper. The use of alum is objectionable also because its presence lowers the dry strength of the resin-treated paper.

In the practice of the present invention wet-strengthened paper is produced by adding to the paper pulp at the wet end of the paper making process a thermosetting synthetic resin of the invention, in its water soluble state, and converting such resin in the paper to its thermoset state.

The wet strength of the resin-treated paper of the invention may be affected when the pH of the pulp suspension prior to the addition of resin is varied. The hardness in the water used to dilute the pulp suspension is another factor which affects wet strength.

The paper pulp may be of any type such as bleached or unbleached kraft, sulphite, or ground wood pulp. The quantity of resin used to treat the paper pulp is within the range ordinarily used in the art of making wet strength paper and varies with the degree of wet strength desired. For example, the minimum desirable concentration of resin is the smallest concentration that gives an appreciable increase in the wet strength of the paper (i. e., about 0.1 per cent resin based on the weight of dry pulp). The maximum desirable concentration of resin (i. e., about 10 per cent based on the weight of dry pulp) is that above which the wet strength imparted to paper is not increased enough to make a larger concentration of resin economical for most applications. A concentration between about 0.25 and about 5 per cent ordinarily gives high wet strength economically and efficiently. The resin may be added to the pulp at the wet end of the paper making process as prepared (i. e., as an approximately 40 to 50 per cent water solution) or, if desired, it may be diluted to about 20 per cent solids, preferably with water at a temperature above 50 degrees F. If a catalyst such as alum or aluminum chloride is used, it should be added to the pulp suspension about five minutes before the resin addition. The resin (and catalyst) may stand on the pulp for a few hours before the mixture is used for making paper. Such contact time should not, however, approach as long a period as 24 hours since a portion of the wet strength is lost under such conditions. The pH of the mixture should be adjusted within a range of 4.0 to 5.5 before use, the pH being lowered to this range using, for example, dilute sulfuric acid. It is most desirable that the pH of the mixture be about 4.5.

The magnitude of the improvement in wet strength of paper embodying the invention over that of paper treated with the best paper-treating resins heretofore known may be demonstrated by tests carried out as follows:

Two resins of the present invention are prepared by the following procedure, using a different molal proportion of dimethylamine gas in each case as shown in the table.

Dimethylamine gas is dissolved in a sufficient amount of water to form a 48 per cent aqueous solution. This solution is added to 2.12 mols of formaldehyde, in a solution consisting of 45 per cent formaldehyde and 55 per cent water contained in a 1 liter 3-necked flask fitted with a thermometer, stirring rod, reflux condenser and oil seals. The temperature of the solution is maintained at about 45° C. and the pH is adjusted to 6.6 with hydrochloric acid. Urea (1 mol) is added. The mixture is then heated to a temperature of about 95° C. within about 15 minutes, before adding formic acid to lower the pH to about 4.8. The reaction is continued at 95° C. until the viscosity of the solution is H—J (measured by the standard Gardner-Holdt bubble viscosity method). The solution is subsequently cooled to a temperature of about 60° C. and is held at this temperature until the viscosity is U—V (Gardner-Holdt). The final resin solution is neutralized with sodium hydroxide to a pH of about 7.8.

A beaten pulp suspension is prepared as follows, using any type of paper pulp, for example, unbleached kraft pulp.

Pulp (400 grams of unbleached kraft pulp containing the equivalent of 360 grams of oven-dried pulp) is soaked in water (10 liters) overnight. The soaked pulp is then agitated for 10 minutes with a "Lightnin" mixer (a high-speed motor-driven stirrer). The agitated suspension is then placed in a "Valley" beater (a standard beater designed for laboratory use) and enough water is added to bring the total volume of water to 23 liters (measured at a temperature of 25 degrees C.). The beater is run for five minutes (slush period) before a load (4500 grams) is placed on the lever arm which applies a force to the beater roll. Samples are withdrawn at various intervals during the beating to measure the rate at which water passes through the pulp (freeness) as Schopper freeness. The beating is terminated (after about one-half hour) when the freeness is 550. The beaten pulp is diluted to such an extent that a volume of approximately 800 ml. gives a dry sheet weighing 2.0 grams. The pH is adjusted to 6.5 by the addition of sulfuric acid. A catalyst is added at this point (3 per cent alum based on the weight of dry pulp). The beaten pulp suspension is allowed to stand for five minutes and is then ready for the addition of the resin for imparting wet strength.

A resin for imparting wet strength (the resin solution prepared as hereinbefore described in an amount sufficient to give 2 per cent resin, based on the weight of dry pulp) is added to the beaten pulp suspension. A volume of stock large enough to give a sheet of the desired 2.0 grams weight (800 ml.) is placed in the sheet machine and diluted to a total volume of 10.7 liters, and the pH is adjusted to 4.5 by addition of sulfuric acid. The handsheet is made within five minutes after the addition of the resin, and the operation is repeated four times without delay to make four more sheets.

The handsheets of wet-strength paper are made according to "Institute of Paper Chemistry—Tentative Method 411–B–Valley." The sheets are pressed separately between six blotters under a pressure of 100 pounds for two minutes. Each sheet is placed on the drier while still in contact with one blotter (sheet against the metal) and dried for five minutes at 250 degrees F. The handsheets are conditioned for 24 hours at a temperature of 78 degrees F., and at 50 per cent relative humidity.

Wet tensile strength measurements are made on a standard pendulum-type tensile tester. The results are given in kilograms per 15 mm. paper strip, tested after soaking for one hour in water at 23° C. The results of the wet tensile strength test are recorded in the table (below), for paper treated with resins formed by the procedure hereinbefore described in which dimethylamine gas is used as a reactant. The paper treated with these resins has a basis weight of 100 pounds ("basis weight" is the weight of 500 sheets of the paper, 25 inches by 40 inches).

For the sake of comparison the results obtained using a control resin to treat the beaten pulp suspension as hereinbefore described are also included in the table. The control resin, a urea-formaldehyde resin modified with tris(2-hydroxyethyl)amine, is prepared by the following procedure:

Methanol-free formalin (2.12 mols of formaldehyde in a solution consisting of 45 per cent formaldehyde and 55 per cent water is added to tris(2-hydroxyethyl)amine (0.15 mol) in a 1 liter 3-necked flask fitted with a thermometer, stirring rod, reflux condenser and oil seals. Sufficient hydrochloric acid to neutralize the tris(2-hydroxyethyl)-ammonium hydroxide formed is then added and the pH of the mixture is adjusted within the range 6.5 to 7.0 with sodium hydroxide. Urea (1 mol) is added and the pH is then adjusted within the range 7.0 to 7.5 with sodium hydroxide. The mixture is heated to 95 degrees C. and held at this temperature for five minutes before addition of formic acid to lower the pH to 5.6. The reaction is continued at 95 degrees C. until the viscosity of the solution is H—I. The solution is then cooled to a temperature of 60 degrees C. and held at that temperature until the viscosity is U—V (Gardner-Holdt). The resin solution is neutralized with sodium hydroxide to a pH range of 7.5 to 8.0

TABLE

| Mol of Dimethylamine Per Mol of Urea | Wet Tensile Strength |
| --- | --- |
| 0.13 | 3.38 |
| 0.05 | 3.44 |
| (control) | 3.17 |

A similar wet tensile strength test is performed on paper treated with a urea-formaldehyde resin modified with dimethylamine hydrochloride, prepared as hereinbefore described. Paper having a basis weight of 40 pounds is treated with this resin of the invention by the procedure hereinbefore described. For the sake of comparison, similar paper stock is treated with the tris(2-hydroxyethyl)amine-modified urea-formaldehyde resin control hereinbefore described. Paper treated with the resin of the invention does not fail until the tensile force is 2.12 kilograms per 15 mm. paper strip, while the paper treated with the control is broken when the tensile force is 1.92 kilograms per 15 mm. paper strip.

These wet strength results and the results shown in the table indicate that paper treated with a resin of the invention possesses better wet strength than paper treated with a tris(2-hydroxyethyl)amine-modified urea-formaldehyde resin, which is the best urea-formaldehyde wet strength resin heretofore known. A dimethylamine-modified urea-formaldehyde resin is also less expensive than the best urea-formaldehyde paper treating resins heretofore known and is much less expensive than melamine-formaldehyde paper treating resins. Furthermore, a resin of the invention may be used as received at the paper mill, while melamine-formaldehyde resins require treatment before use in a paper manufacturing process.

Wet strengthened paper embodying the invention is prepared in accordance with the present method by the following procedure:

Example

A beaten pulp suspension of any type of paper pulp such as bleached or unbleached sulphite, kraft, or ground wood pulp is prepared, with or without alum, for the addition of a resin for imparting wet strength, in accordance with the procedure hereinbefore described. A resin of the invention for imparting wet strength (any dimethylamine-modified urea-formaldehyde resin solution in which the proportion of dimethylamine is from 0.01 to 0.3 mol per mol of urea, prepared according to the procedures hereinbefore described in an amount sufficient to give 2 per cent of resin based on the weight of dry pulp) is added to the beaten pulp suspension. Handsheets made as hereinbefore described from such a resin-treated beated pulp suspension have substantially greater wet strength per unit of cost than any resin-impregnated paper sheets heretofore known.

Having described the invention, I claim:

1. A thermosetting water-soluble synthetic resin capable of imparting improved wet strength to paper, comprising a product of the reaction in aqueous solution at a pH of from about 4.6 to about 7.0 of formaldehyde, urea, and dimethylamine; the formaldehyde being reacted in an amount from 1.8 to 2.4 mols per mol of urea and the dimethylamine being reacted in an amount from 0.01 to 0.3 mol of dimethylamine per mol of urea.

2. A thermosetting water-soluble synthetic resin as claimed in claim 1 wherein amino groups in the resin are neutralized by an acid.

3. Paper of improved wet strength comprising a thermosetting synthetic resin claimed in claim 2, in its thermoset state.

4. Paper of improved wet strength comprising a thermosetting water-soluble synthetic resin claimed in claim 1, in its thermoset state.

5. As a new composition of matter, a water-soluble thermosetting resinous product having a viscosity of 2 to 8.8 poises when measured as a 51 to 53% aqueous solution at 25° C. obtained by chemically reacting as the essential reactants urea, formaldehyde and dimethylamine in aqueous solution at a pH of about 7 and at a temperature from about 60° C. to the boiling point of the solution, and then polymerizing the resultant mixture at a temperature from about 60° C. to the refluxing temperature at a pH from about 5.0 to about 6.0, the formaldehyde being reacted in an amount from 2.0 to 2.4 moles per mole of urea and the dimethylamine being reacted in an amount from 0.1 to 0.3 mole per mole of urea.

6. As a new composition of matter, a water-soluble thermosetting resinous product having a viscosity of 2 to 6 poises when measured as a 51 to 53% aqueous solution at 25° C. obtained by chemically reacting as the essential reactants urea, formaldehyde and dimethylamine in aqueous solution at a pH of about 7 and at a temperature from about 60° C. to the boiling point of the solution, and then polymerizing the resultant mixture at a temperature from about 60° C. to the refluxing temperature at a pH from about 5.0 to about 6.0, the formaldehyde being reacted in an amount from 2.0 to 2.4 moles per mole of urea and the dimethylamine being reacted in an amount from 0.1 to 0.3 mole per mole of urea.

7. As a new composition of matter, a water-soluble thermosetting resinous product having a viscosity of 2 to 6 poises when measured as a 51 to 53% aqueous solution at 25° C. obtained by chemically reacting as the essential reactants urea, formaldehyde and dimethylamine in aqueous solution at a pH of about 7 and at a temperature from about 60° C. to the boiling point of the solution, and then polymerizing the resultant mixture at a temperature from about 60° C. to the refluxing temperature at a pH from about 4.6 to about 6.0, the formaldehyde being reacted in an amount from 2.0 to 2.4 moles per mole of urea and the dimethylamine being reacted in an amount from 0.05 to 0.3 mole per mole of urea.

8. As a new composition of matter, a water-soluble thermosetting resinous product having a viscosity of 2 to 8.8 poises when measured as a 51 to 53% aqueous solution at 25° C. obtained by chemically reacting as the essential reactants urea, formaldehyde and dimethylamine in aqueous solution at a pH of from about 6.6 to about 7 and at a temperature from about 60° C. to the boiling point of the solution, and then polymerizing the resultant mixture at a temperature from about 60° C. to the refluxing temperature at a pH from about 4.6 to about 6.0, the formaldehyde being reacted in an amount from 1.8 to 2.4 moles per mol of urea and the dimethylamine being reacted in an amount from 0.01 to 0.3 mole per mole of urea.

References Cited in the file of this patent

UNITED STATES PATENTS

| | | |
|---|---|---|
| 2,261,084 | Hovey et al. | Oct. 28, 1941 |
| 2,286,752 | Mighton | June 16, 1942 |
| 2,328,901 | Grimm et al. | Sept. 7, 1943 |
| 2,497,074 | Dudley et al. | Feb. 14, 1950 |
| 2,605,253 | Auten | July 29, 1952 |

FOREIGN PATENTS

| | | |
|---|---|---|
| 613,678 | Germany | May 23, 1935 |